(12) United States Patent
Armstrong et al.

(10) Patent No.: US 7,487,595 B2
(45) Date of Patent: *Feb. 10, 2009

(54) MEASURING ARRANGEMENT TO DETERMINE LOCATION OF CORNERS FOR A BUILDING FOUNDATION AND A WOODEN BASE FRAME, AND THE USE THEREOF

(76) Inventors: Timothy D. Armstrong, 312 N. 5th St., Youngwood, PA (US) 15697-1320; Glenn T. Hathaway, 19 3rd St., Attleboro, MA (US) 20703

( * ) Notice: Subject to any disclaimer, the term of this patent is extended or adjusted under 35 U.S.C. 154(b) by 183 days.

This patent is subject to a terminal disclaimer.

(21) Appl. No.: 11/445,935

(22) Filed: Jun. 2, 2006

(65) Prior Publication Data

US 2007/0074410 A1    Apr. 5, 2007

(51) Int. Cl.
*G01C 15/02* (2006.01)
(52) U.S. Cl. .................. 33/286; 33/1 LE; 33/DIG. 21
(58) Field of Classification Search .................. 33/1 G, 33/1 LE, 227, 275 R, 285, 286, 353, 404, 33/405, 413, DIG. 21
See application file for complete search history.

(56) References Cited

U.S. PATENT DOCUMENTS

| | | | | |
|---|---|---|---|---|
| 735,899 A | * | 8/1903 | Paul | 356/255 |
| 1,401,200 A | * | 12/1921 | Smith | 33/285 |
| 2,665,482 A | * | 1/1954 | Rupp | 33/1 R |
| 2,685,739 A | * | 8/1954 | Cole | 33/1 R |
| 2,693,642 A | * | 11/1954 | Lacefield | 33/281 |
| 3,044,173 A | * | 7/1962 | O'Neal et al. | 33/227 |
| 4,095,343 A | * | 6/1978 | McPhail | 33/1 LE |
| 4,228,588 A | * | 10/1980 | Horton, Jr. | 33/1 H |
| 5,784,792 A | * | 7/1998 | Smith | 33/227 |
| 6,141,880 A | * | 11/2000 | Vircks | 33/1 G |
| 6,415,518 B1 | * | 7/2002 | Sims | 33/286 |
| 6,487,783 B1 | * | 12/2002 | Thomas, Jr. | 33/414 |
| 6,532,676 B2 | * | 3/2003 | Cunningham | 33/286 |
| 6,732,439 B1 | * | 5/2004 | Radke et al. | 33/286 |
| 6,751,879 B1 | * | 6/2004 | Pu | 33/286 |
| 6,833,962 B2 | * | 12/2004 | Bergen | 359/626 |
| 7,137,207 B2 | * | 11/2006 | Armstrong et al. | 33/286 |

* cited by examiner

*Primary Examiner*—G. Bradley Bennett
(74) *Attorney, Agent, or Firm*—Nils H. Ljungman & Associates

(57) ABSTRACT

An arrangement comprising a laser projection device is used in determining the location of corners in constructing a foundation of a building or other structure. The arrangement is also used in positioning wooden beams perpendicular to one another in a floor frame or similar structure.

6 Claims, 17 Drawing Sheets

MEASURING ARRANGEMENT TO DETERMINE LOCATION OF CORNERS FOR A BUILDING FOUNDATION AND A WOODEN BASE FRAME, AND THE USE THEREOF

CROSS-REFERENCE TO RELATED APPLICATIONS

This application claims the priority and benefit of U.S. Provisional Application No. 60/480,624 filed Jun. 23, 2003 in the name of the same inventors, Timothy D. Armstrong and Glenn T. Hathaway, and claims the priority and benefit of U.S. patent application Ser. No. 10/874,894 filed Jun. 23, 2004 in the name of the same inventors, Timothy D. Armstrong and Glenn T. Hathaway.

BACKGROUND OF THE INVENTION

1. Field of the Invention

The present invention relates to an arrangement for use in determining the location of corners in constructing a foundation of a building or other structure. The present invention further relates to an arrangement for use in positioning wooden beams for a floor frame or similar structure.

2. Background Information

In construction, it is well known that establishing a secure and well designed foundation is essential in constructing buildings, homes, and other large structures. Poorly designed foundations often create difficulty in construction and lessen the stability of the structure. It is very important to lay a foundation in the ground that corresponds as exactly as possible to the shape and dimensions of the structure to be built. Since most buildings and other structures are square or rectangular in shape, it is necessary to accurately measure and position the four corners of the foundation. If the foundation does not accurately match the design of the structure, the aforementioned problems will result.

In that regard, construction workers generally use a well-known measuring technique in which a stake or like object is placed in the ground at a position where one corner of the foundation will be. A second stake is then placed a distance, for example, six feet, from the first stake. The two stakes define a first straight line which represents a portion of a side wall of the foundation. A third stake is then positioned a distance, for example, eight feet, from the first stake. The first and third stakes define a second straight line, which second straight line should be perpendicular to the first straight line to form an 90 degree angle. In this manner, a corner is defined that is located at the first stake.

Since the positioning of the stakes to define the corner is approximated, an additional step must be taken to ensure that the lines are perpendicular and that the corner thus defines a 90 degree angle. One worker utilizes a tape measure or other appropriate device to measure the distance between the second and third stakes, which distance is the hypotenuse of a right triangle defined by the three stakes. The hypotenuse will of course be the square root of the sum of the squares of the other two sides. In this particular example, the two sides are six and eight feet, and thus the hypotenuse will measure ten feet. Therefore, one worker measures the hypotenuse distance to see if the distance is ten feet, which would mean that the corner is a 90 degree angle. If the distance is not ten feet, which often occurs, then the stakes must be moved by another worker and the distance measured again by the first worker. The workers move the stakes and measure the distance again and again until the right distance and angles are found that result in the defining of the 90 degree angle.

The above process often takes a considerable amount of time and requires two or more workers to perform the process. Further, because the workers' best guess or estimation is utilized in positioning the stakes, the possibility for error is greatly increased.

The perpendicular positioning of wooden beams is also necessary when building wooden decks, floors, and porches. For example, when building a wooden structure such as a floor, a porch, or an outdoor deck, the base frame usually comprises two parallel ends made of one or more wooden beams. The base frame further comprises several additional wooden cross beams that are placed perpendicular to the end beams and spaced apart from each other a predetermined distance. The spacing and positioning of the beams in the frame should be as exact as possible to increase stability and strength of the base frame. Due to human error and inaccuracy in measurement and placement, the chances of misplacing the wooden beams increases. Further, usually two workers are required to properly align and secure the beams.

OBJECT OF THE INVENTION

The object of the present invention is to simplify the above-described processes while improving accuracy and efficiency by utilizing a laser measuring and placement apparatus that could be effectively used by a single worker.

SUMMARY OF THE INVENTION

To achieve the above object, the present invention, in at least one possible embodiment, discloses the use of a laser beam to determine a line that is perpendicular to another line to define a corner. In one embodiment of the present invention, a worker first places a stake or like object in the ground where the corner of a foundation will be placed. A second stake is then placed a distance from the first stake. A string or wire can be tied to each of the stakes to define a straight line that is substantially parallel to the ground.

After the string has been attached to the stakes, a device that projects a laser beam may then be placed on the string. The device could comprise a bubble level to ensure that the device is parallel to the ground to thus essentially ensure that the device projects a laser beam that is substantially parallel to the ground. The device could project a beam that is substantially perpendicular to the string. Once the worker has positioned the device at the location where the corner of the foundation will be placed, the worker takes a third stake and positions it a distance from the first stake in the path of the laser beam. In this manner, the worker can position the third stake, regardless of the distance, to define a line that is substantially perpendicular to the line defined by the first and second stakes.

The above process thus essentially eliminates the need to measure the distance between any of the stakes. Further, only one worker is required to perform the process. In addition, estimations of the positioning of the stakes can be eliminated and thus the accuracy of the corner measurement can be increased. Finally, the process can in most cases be completed after one try, so no additional measuring and repositioning would be required, and thus the time required to complete the process would be reduced.

In at least one possible embodiment of the present invention, two stakes can be placed in the ground along the line defined by the laser. A string can be tied between these two stakes so that the corner is defined by the strings tied between the two pairs of stakes.

The laser device can be attached to the string tied between the first and second stakes in a number of ways. In one possible embodiment of the present invention, the laser device has a body to house the laser and a hanging projection, such as a hook or hooks, projecting from the body. The hanging projection can be utilized to hang the laser device from the string.

In yet another possible embodiment, the laser can project from only one side of the laser device. In still another possible embodiment, the laser can project from both sides of the laser device. The laser device could have two laser diodes that each project a separate beam in opposite directions. In an alternative embodiment, the laser device could have a single laser diode and a splitter device to split the laser into two beams traveling in opposite directions.

The laser measurement and positioning system can also be used to position solid objects, such as wood planks or beams, at right angles to each other. For this particular use, the laser device could be mounted or placed on one of the end beams of the base frame. The laser device could be mounted on the top or sides of a bracket that fits on the wooden beam. A laser beam could then be projected from the device and perpendicular to the wooden beam. The wooden cross beams could then be placed along the path of the laser beam to establish a perpendicular alignment with respect to the end beam.

In additional possible embodiments, the laser device that is mounted on top of the bracket could have more than one laser beam projector. For example, the top-mounted laser device could have four laser beams projecting in four directions in a single horizontal plane, such that two lines are defined that lie in the plane and are perpendicular to one another. The laser device could further comprise two laser beam projectors mounted on opposite sides of the bracket structure to project one beam from each side to define a single line perpendicular to the wooden beam.

In another possible embodiment, the laser device could be powered by a battery or batteries, such as double A or triple A batteries, or any other suitable battery type. The battery could be housed in the body of the laser device.

The above-discussed embodiments of the present invention will be described further hereinbelow. When the word "invention" is used in this specification, the word "invention" includes "inventions", that is the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

DESCRIPTION OF THE PREFERRED EMBODIMENT

Figure 1:
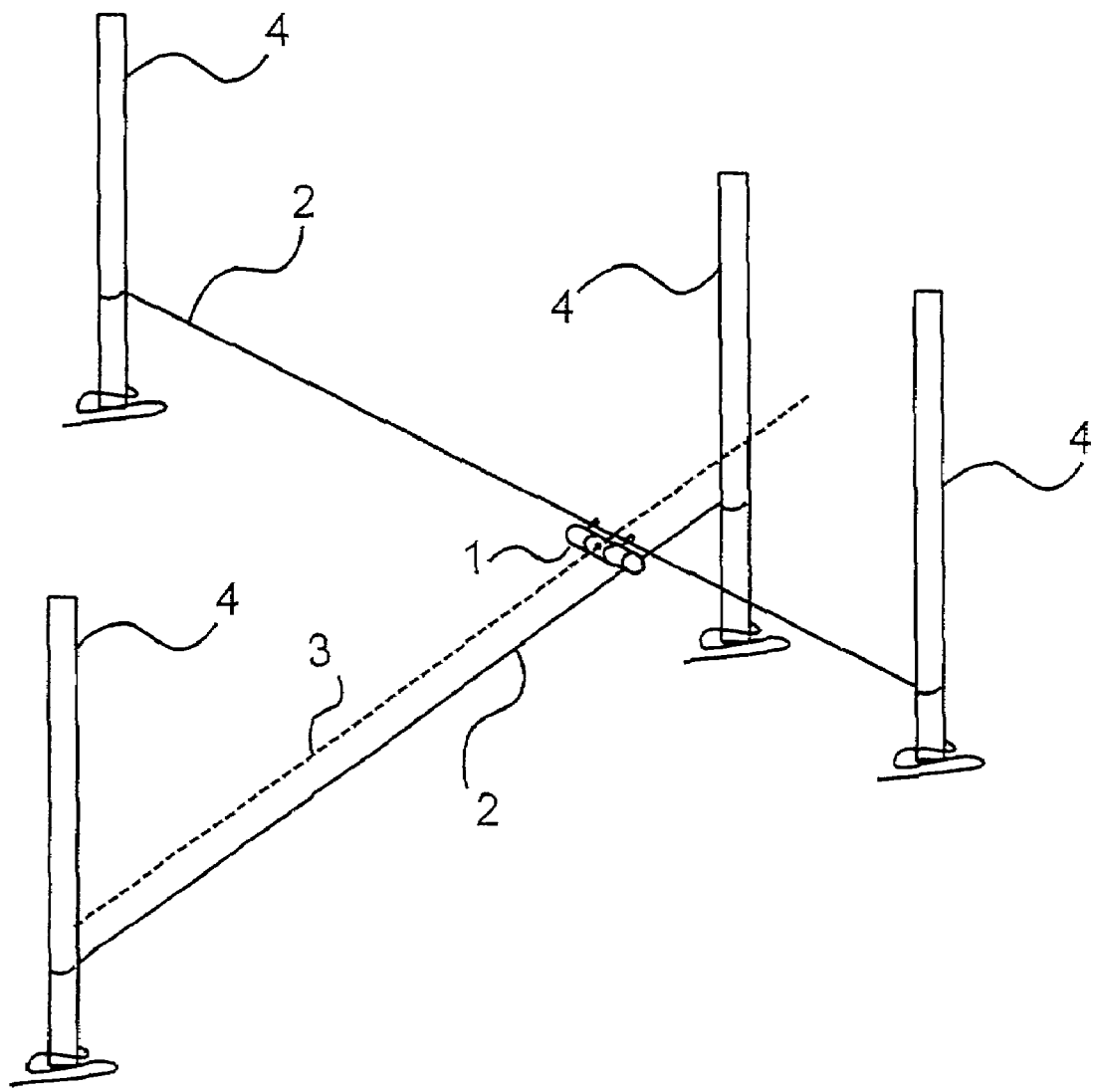
FIG. 1 shows a laser device according to at least one embodiment of the present invention on a string tied between two stakes to define a corner.

Please note that the same reference numerals have been used in some of the figures for similar components of different embodiments of the present invention.

FIG. 1 shows a laser device 1 according to at least one embodiment of the present invention on a string or wire 2 tied between two stakes or posts 4 to define a corner. The laser device 1 is hung from the string 2 and projects a laser beam 3 out two sides to define a line substantially perpendicular to the string 2. Two additional stakes 4 are placed in the ground in the path of the laser beam 3. An additional string 2 is then tied between the two additional stakes 4, and thus a 90 degree angle is defined by the two strings 2. The intersection of the two strings 2 defines a corner for a square or rectangular building foundation. The process can be repeated for each of the other three corners.

Figure 2:
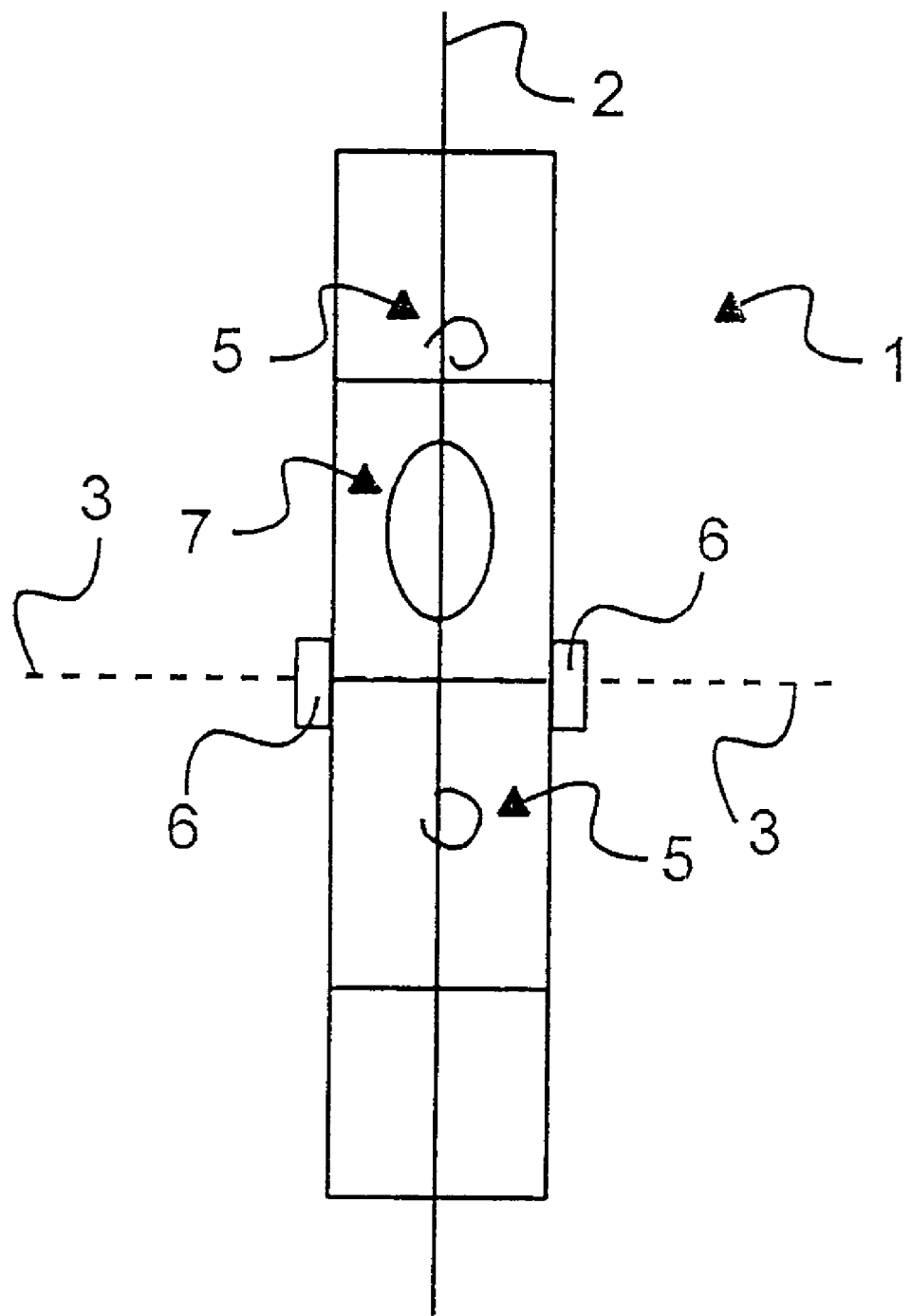
FIG. 2 shows a top close-up view of the laser device shown in FIG. 1.

FIG. 2 shows a top close-up view of the laser device 1 shown in FIG. 1. The laser device 1 is hung from the string 2 by hooks 5 so that the laser device 1 can be easily hung and moved on the string 2. The hooks 5 also permit the easy removal of the laser device 1 for additional use. In this particular embodiment, the laser device 1 has a bubble level 7 to permit the user to verify that the laser device 1 is parallel to the ground. The laser device 1 comprises laser projectors 6 that project the laser beam 3.

Figure 3:
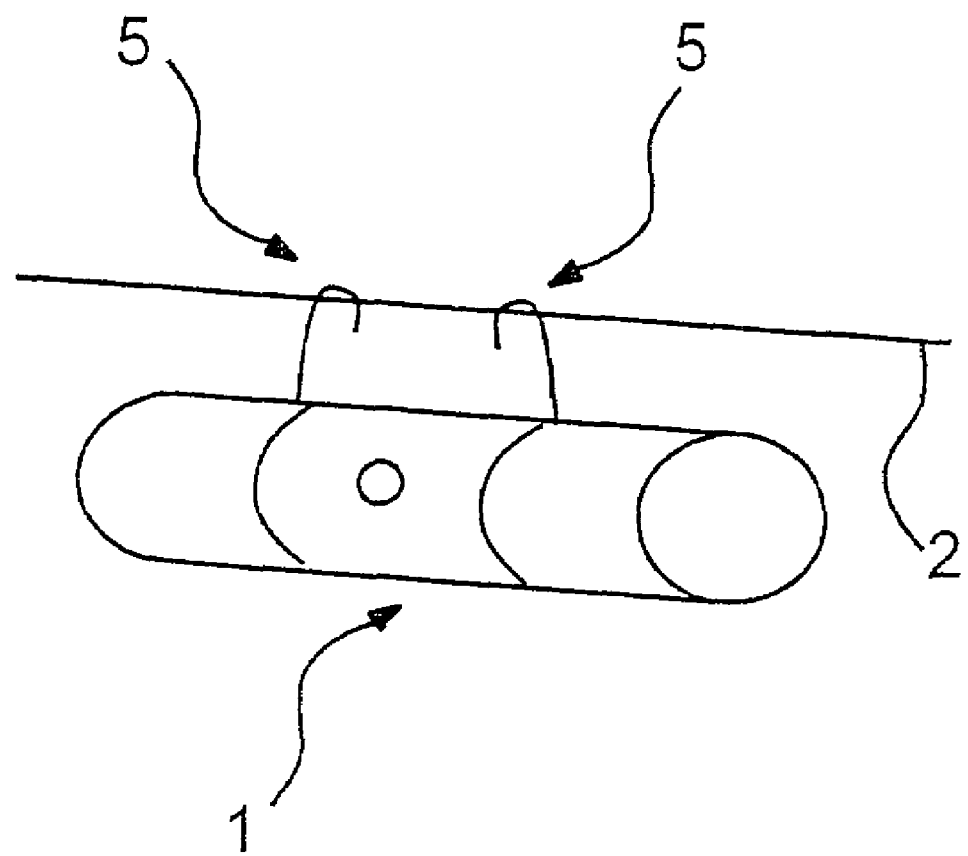
FIG. 3 shows a side perspective close-up view of the laser device shown in FIG. 1.

FIG. 3 shows a side perspective close-up view of the laser device shown in FIG. 1. The hooks 5 from which the laser device 1 hangs are clearly shown.

Figure 4:
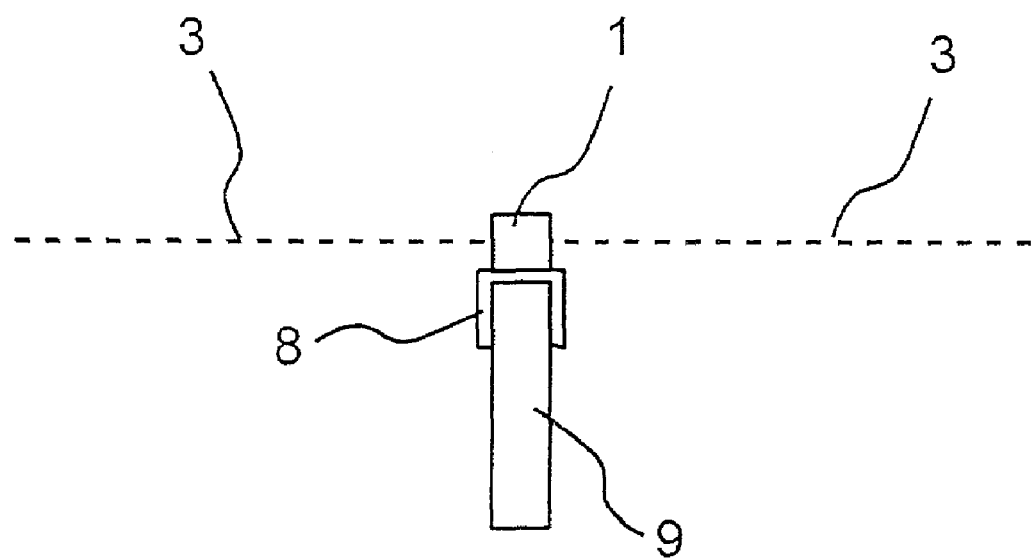
FIG. 4 shows a laser device according to at least one embodiment of the present invention mounted on a wooden beam.

FIG. 4 shows a laser device 1 according to at least one embodiment of the present invention mounted on a wooden beam 9. The laser device 1 is attached to a mounting device 8, such as a bracket. The laser device 1 projects a laser beam or beams 3 to permit a user to position another wooden beam (not shown) in a position perpendicular to the wooden beam 9.

Figure 5:
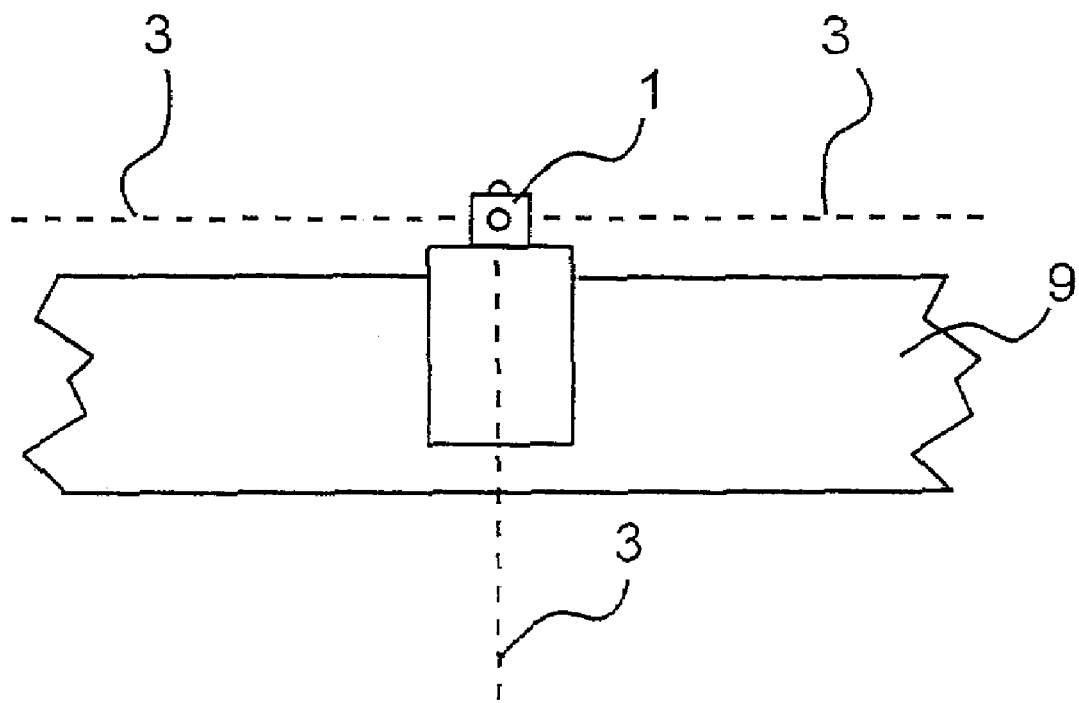
FIG. 5 shows a side view of the laser device shown in FIG. 4.

FIG. 5 shows a side view of the laser device 1 shown in FIG. 4.

Figure 6:
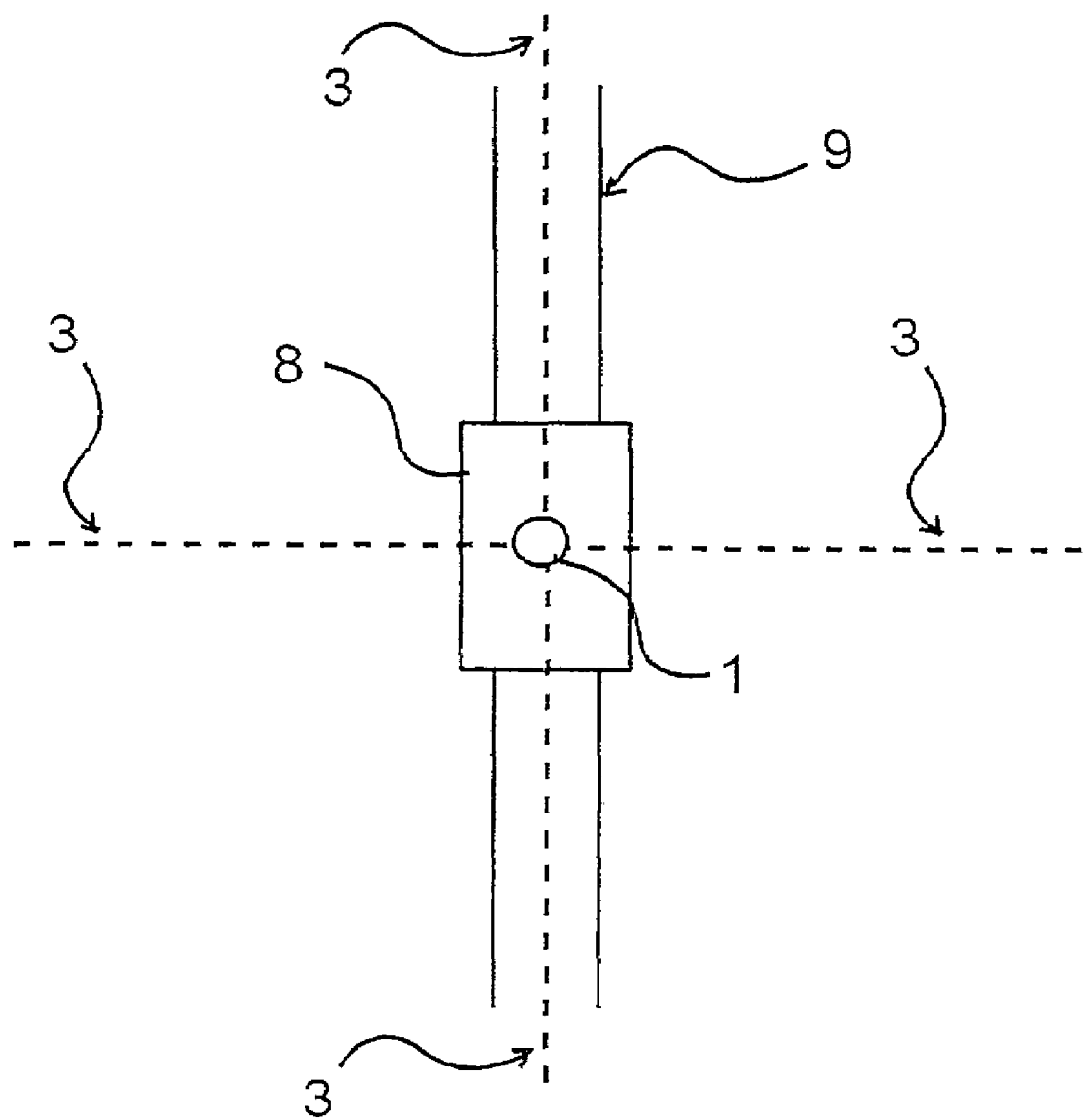
FIG. 6 shows a top view of the laser device shown in FIG. 4.

FIG. 6 shows a top view of the laser device 1 shown in FIG. 4. As can be seen in FIG. 6, the laser device 1, according to at least one possible embodiment, can project laser beams 3 in several directions. In the embodiment shown in FIG. 6, the laser beams 3 project away from the laser device in four directions.

Figure 7:
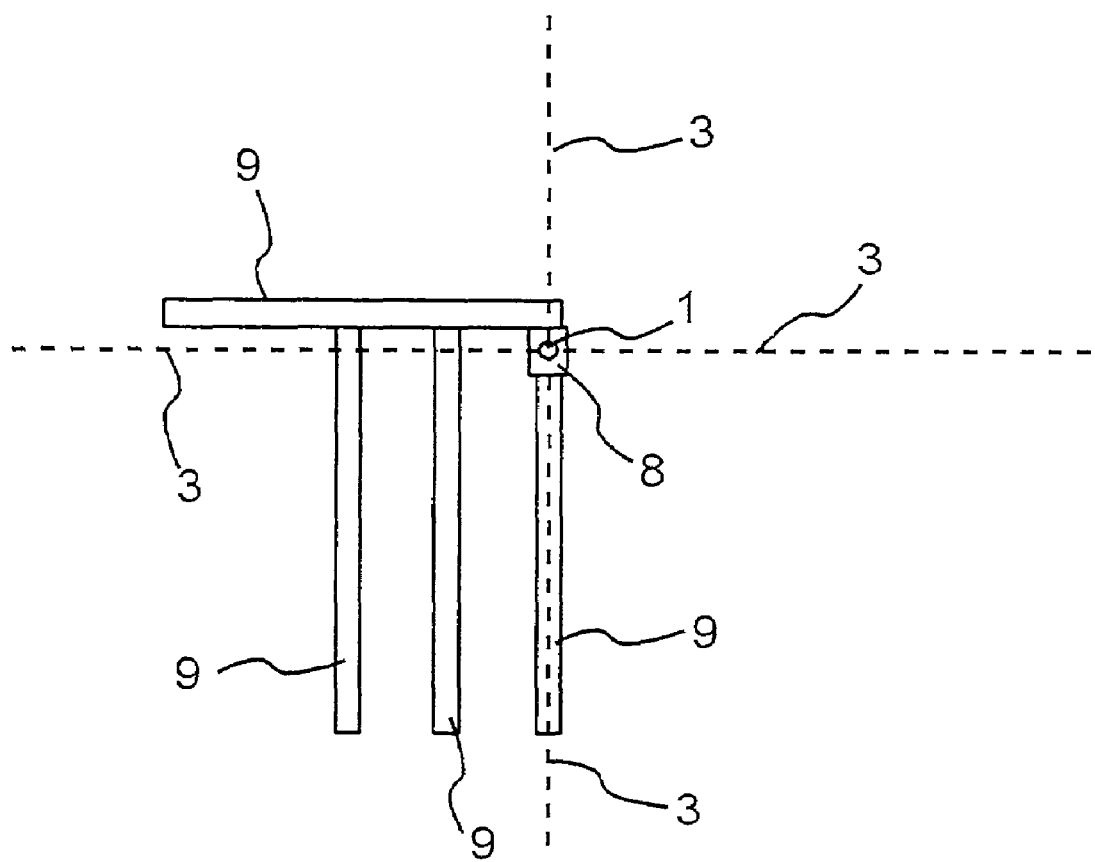
FIG. 7 shows the laser device shown in FIG. 6 as used to position wooden beams in a base frame.

FIG. 7 shows the laser device 1 shown in FIG. 6 as used to position wooden beams 9 in a base frame.

Figure 8:
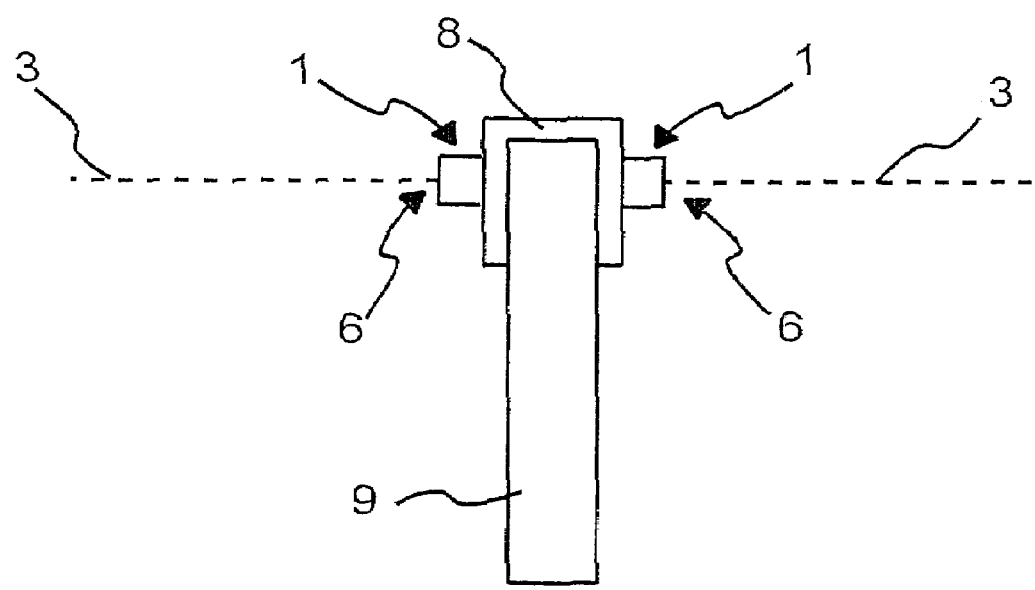
FIG. 8 shows a laser device according to at least one embodiment of the present invention mounted on a wooden beam.

FIG. 8 shows a laser device 1 according to at least one embodiment of the present invention mounted on a wooden beam 9. Instead of having a top-mounted laser device 1, as shown in FIG. 4, the embodiment shown in FIG. 8 has two side-mounted laser devices 1 placed on opposite sides of the mounting bracket 8. Each of the laser devices 1 has a laser projector 6 to project two laser beams 3 in opposite directions to define a straight line.

Figure 9:
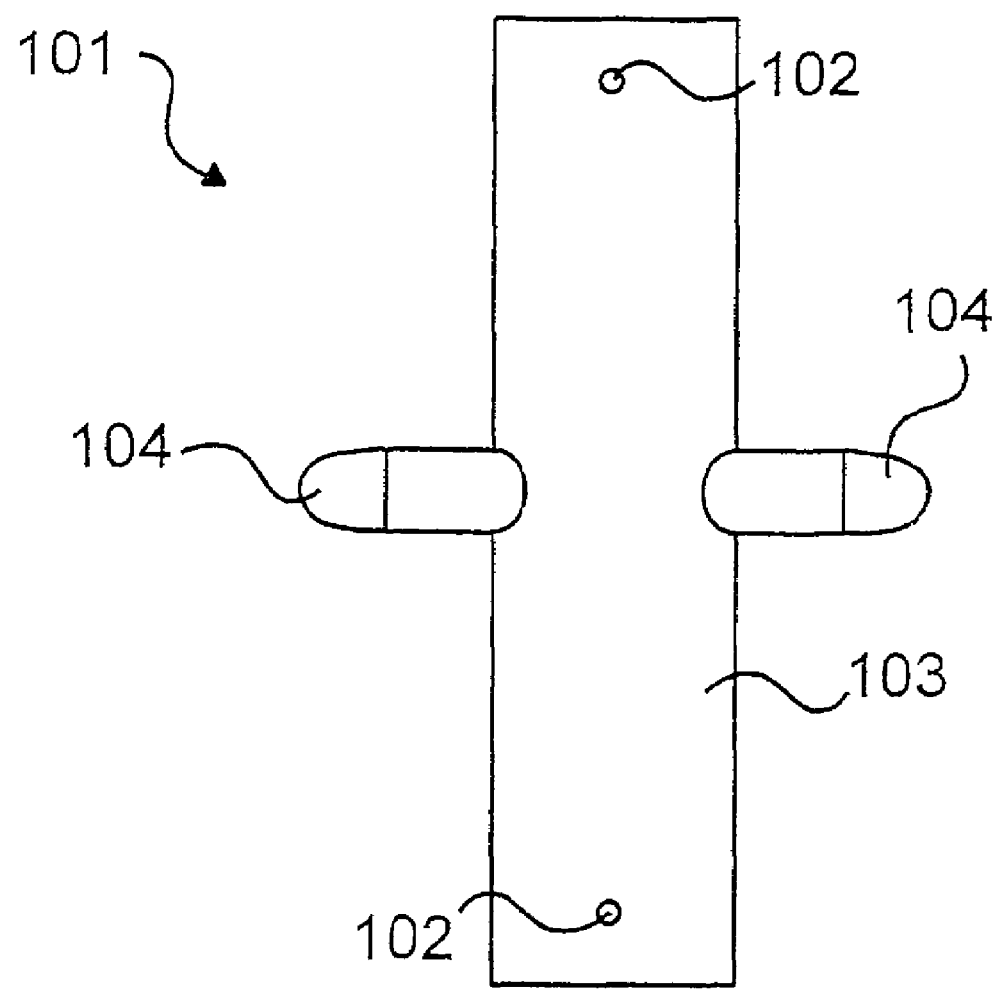
FIG. 9 shows a top view of a laser device according to at least one possible embodiment which projects two laser beams.

FIG. 9 shows a top view of a laser device 101 according to at least one possible embodiment which projects two laser beams. The laser device 101 has two attachment points or attachment holes 102 to which a hook or hooks, or other similar, suitable structure, can be connected, inserted, or attached. The hook structure would be utilized to suspend the laser device 101 from a string or wire tied between two stakes such that the body 103 of the laser device 101 would be substantially parallel to the string. Projecting arms 104 extend perpendicular to the body 103 and thus perpendicular to the string from which the laser device is suspended. The body 103 houses the power source, such as a battery, that powers the laser diode or diodes in the laser device 101.

Figure 10:
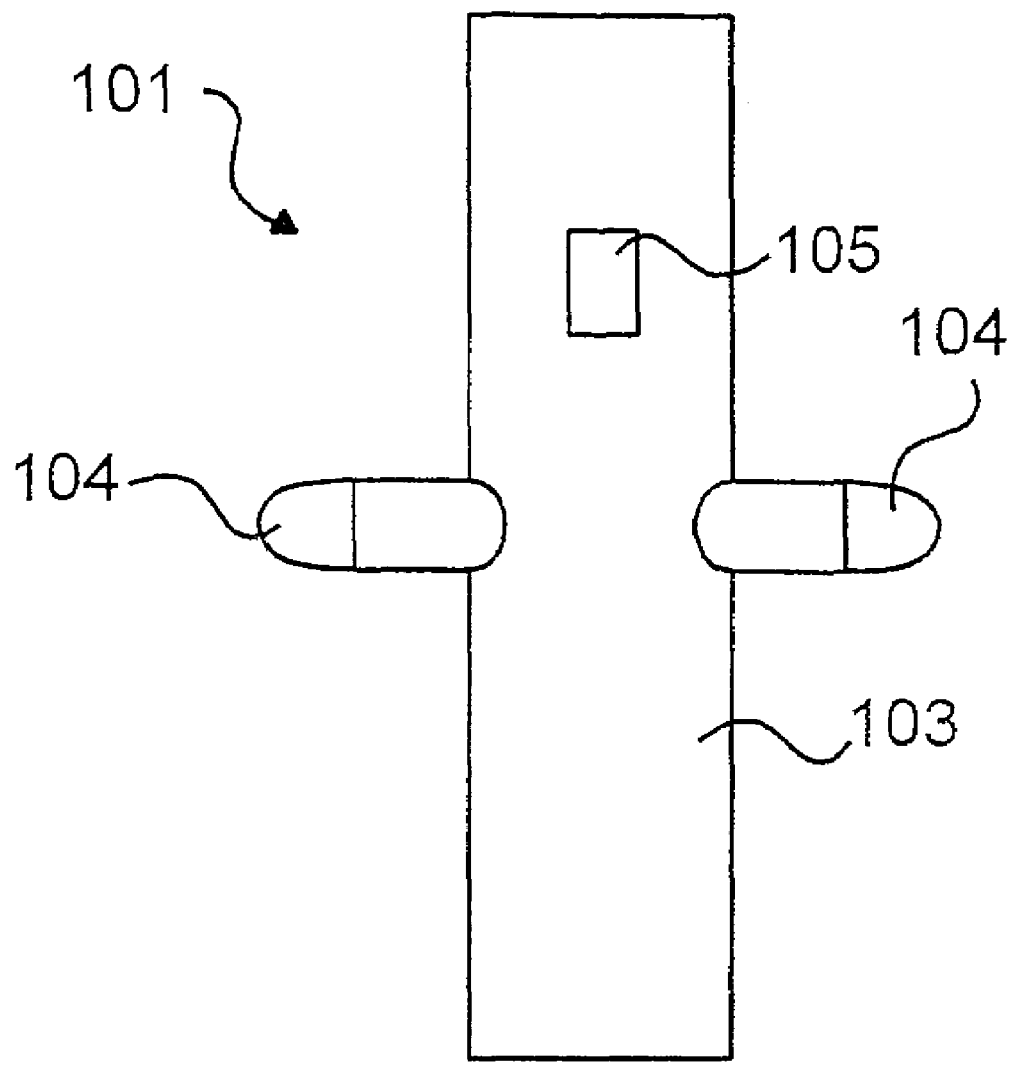
FIG. 10 shows a bottom view of the laser device shown in FIG. 9.

FIG. 10 shows a bottom view of the laser device 101 shown in FIG. 9, which bottom view is opposite to the front view. On the bottom side of the laser device 101 is located a switching device 105 to permit a user to manually switch the device on and off.

Figure 11:
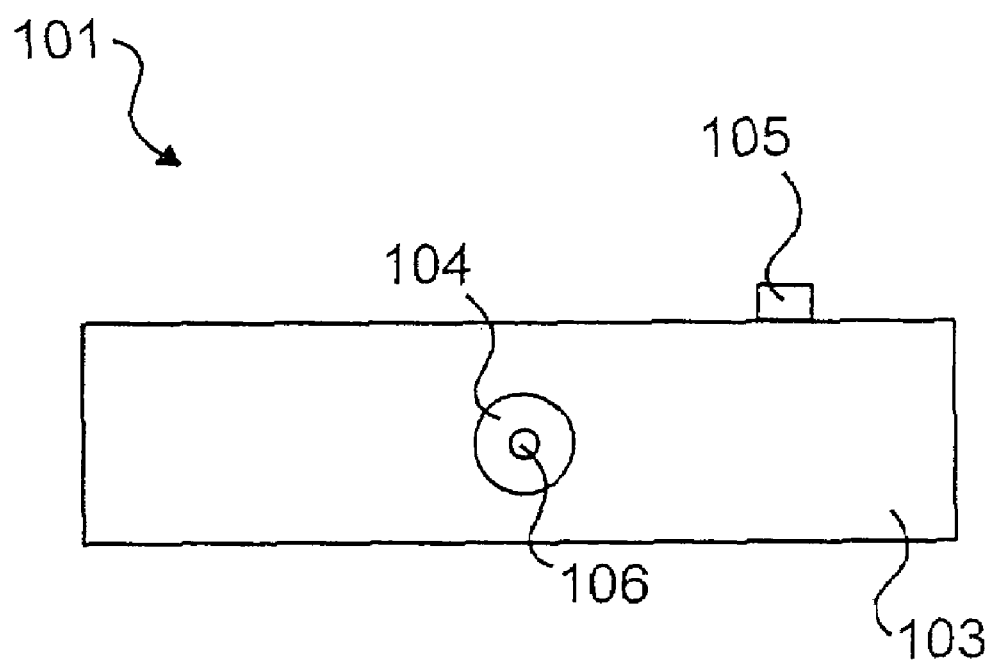
FIG. 11 shows a side view of the laser device shown in FIG. 9.

FIG. 11 shows a side view of the laser device shown in FIG. 9. There is an opening 106 in the end of the projecting arm 104 from which the laser beam travels. Since the projecting arms 104 are essentially perpendicular to the body 103 and a string from which the laser device 101 is suspended, a laser beam can be projected essentially perpendicular to the string to define a right angle. In one embodiment, a lens (not shown) is located adjacent the opening 106.

Figure 12:
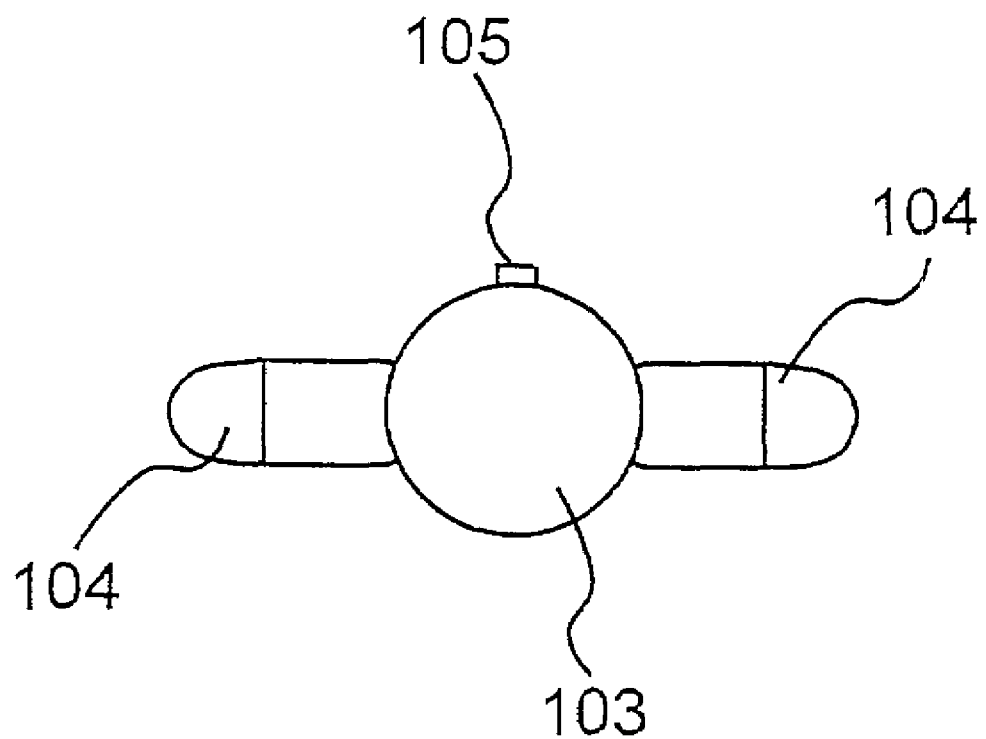
FIG. 12 shows an end view of the laser device shown in FIG. 9.

FIG. 12 shows an end view of the laser device shown in FIG. 9.

Figure 13:
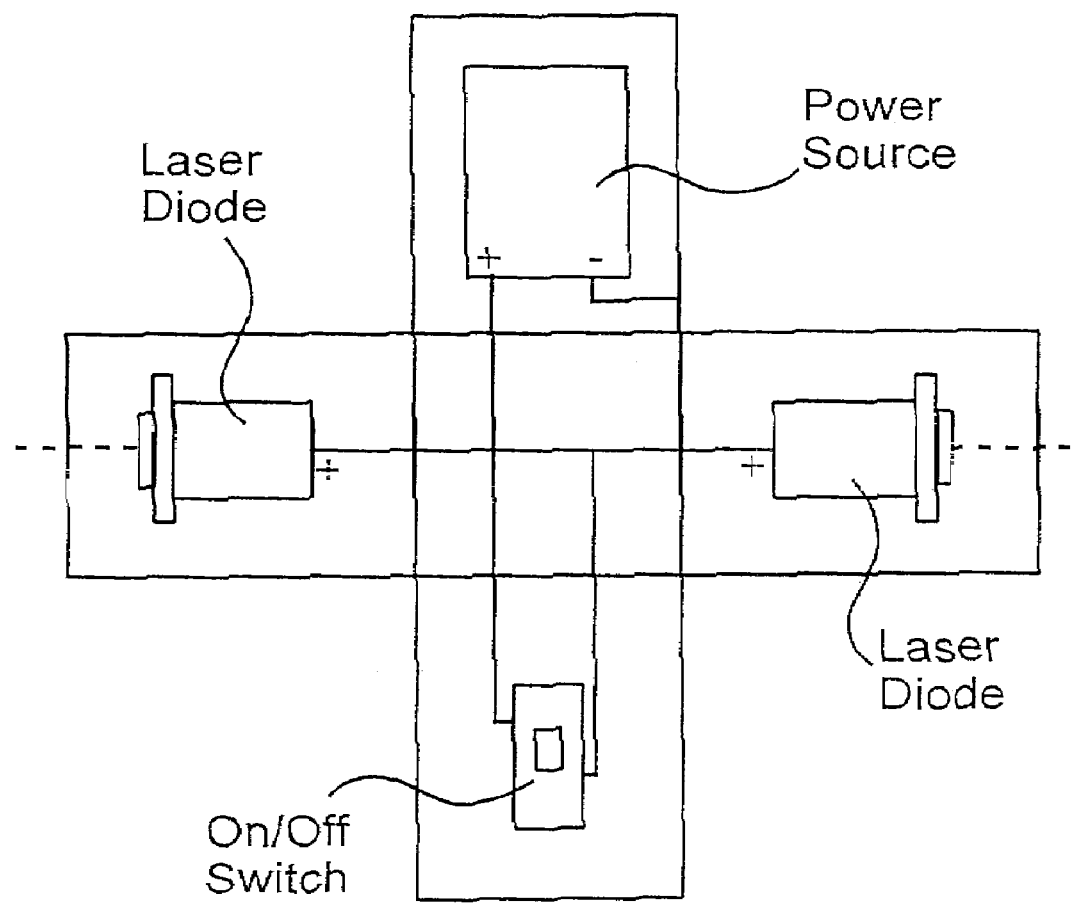
FIG. 13 shows a schematic view of a power source and laser system for a laser device which projects two laser beams according to at least one possible embodiment.

FIG. 13 shows a schematic view of a power source and laser system for a laser device which projects two laser beams according to at least one possible embodiment. The laser device has a power source, such as a battery, that is connected to an on/off switch. The on/off switch controls the supply of power to two separate laser diodes, each of which generate and project a laser beam out of opposite sides of the laser device. In the embodiment shown, the wiring shows the negative or ground connection being connected to the outer casing or housing of the laser device. In an alternative embodiment not shown, the negative connection could also be directly connected to the laser diodes.

Figure 14:
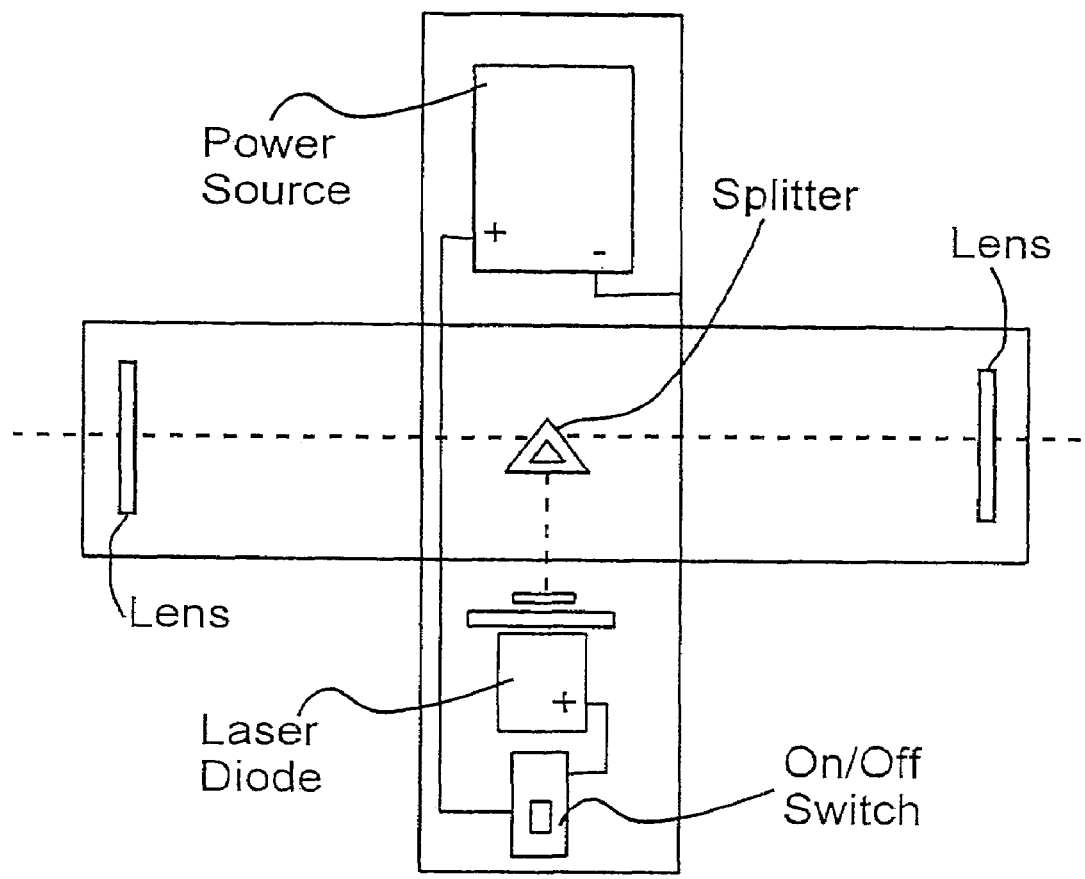
FIG. 14 shows a schematic view of a power source and laser system for a laser device which projects two laser beams according to at least one other possible embodiment.

FIG. 14 shows a schematic view of a power source and laser system for a laser device which projects two laser beams according to at least one other possible embodiment. This embodiment is similar to that shown in FIG. 13, however only one laser diode and a splitter device are used to create two laser beams. Power is supplied to the laser diode by a power source, and the flow of power is controlled by an on/off switch. A laser beam is generated by the laser diode and contacts the splitter device, which then splits the laser beam into two separate beams heading in opposite directions.

Figure 15:
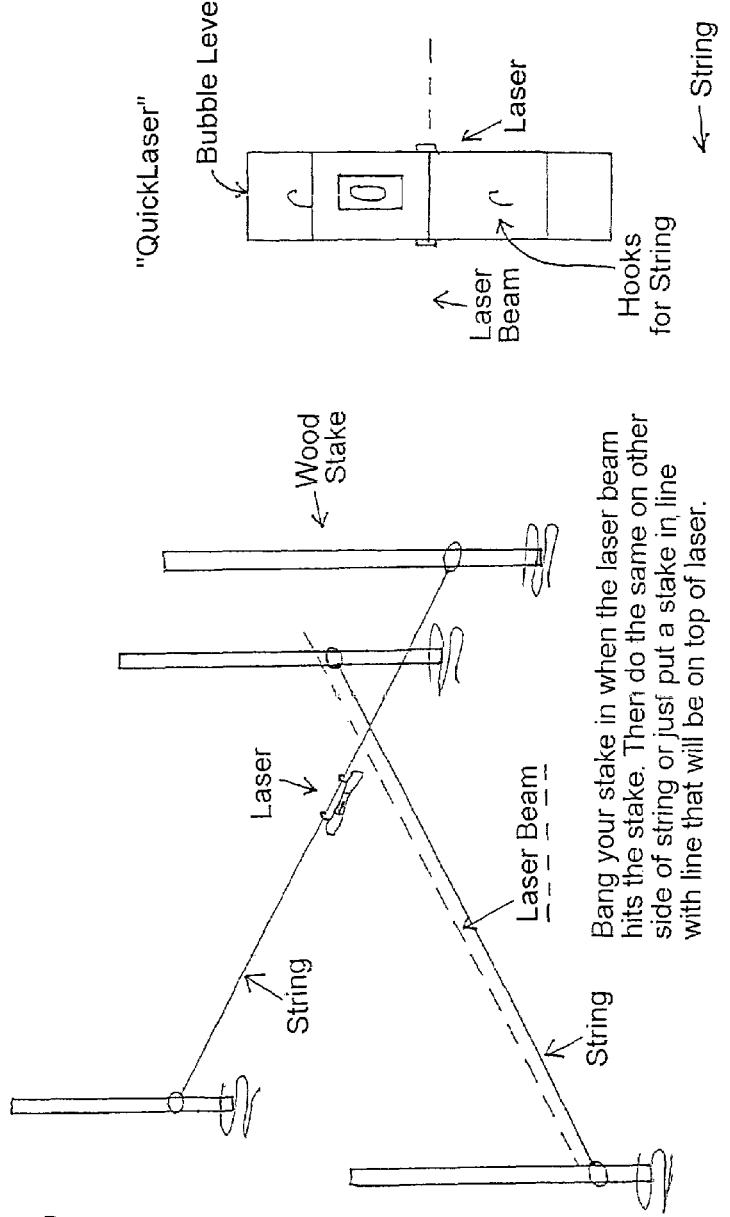
FIG. 15 shows another possible embodiment with additional description.
Figure 16:
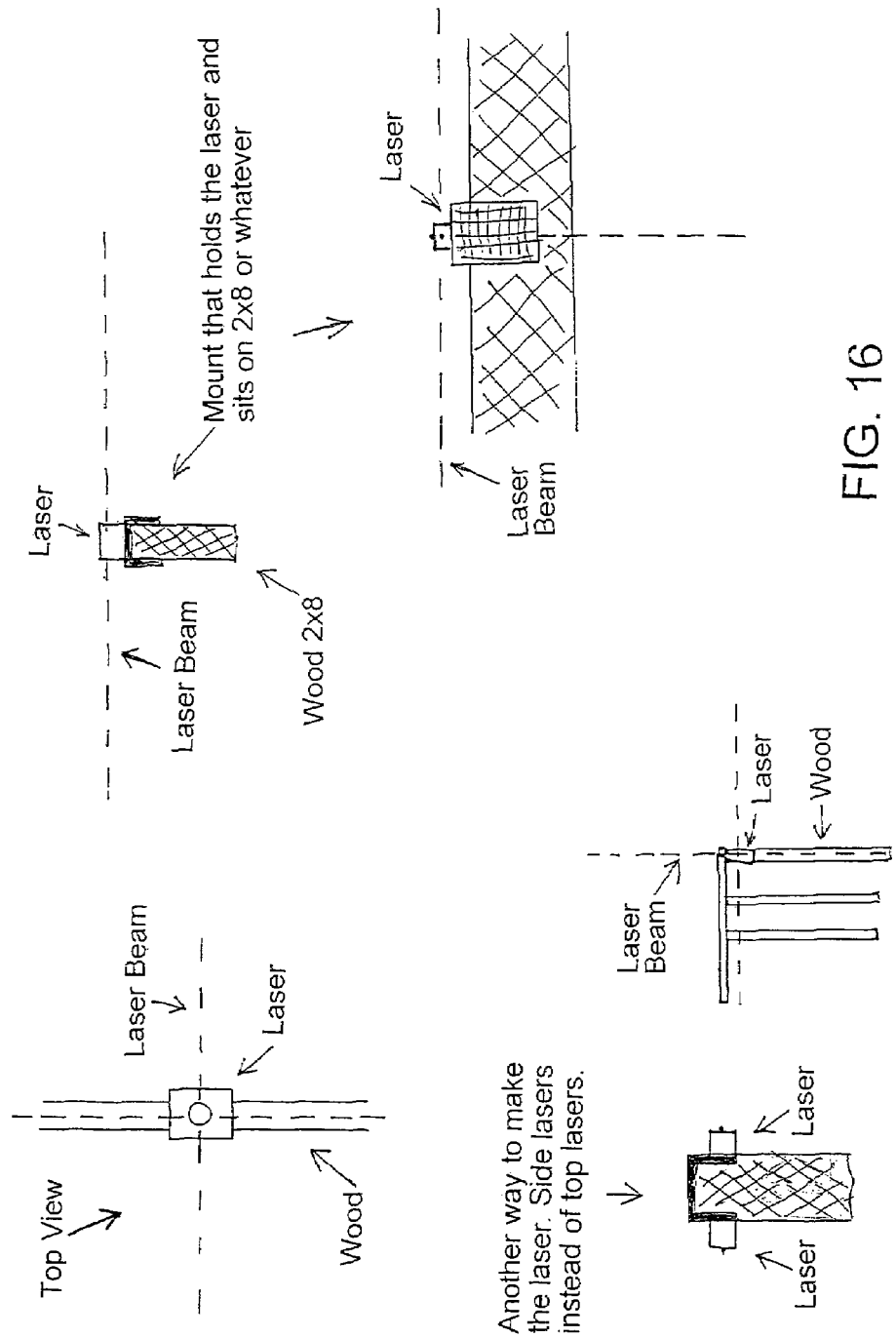
FIG. 16 shows a further possible embodiment with additional description.
Figure 17:
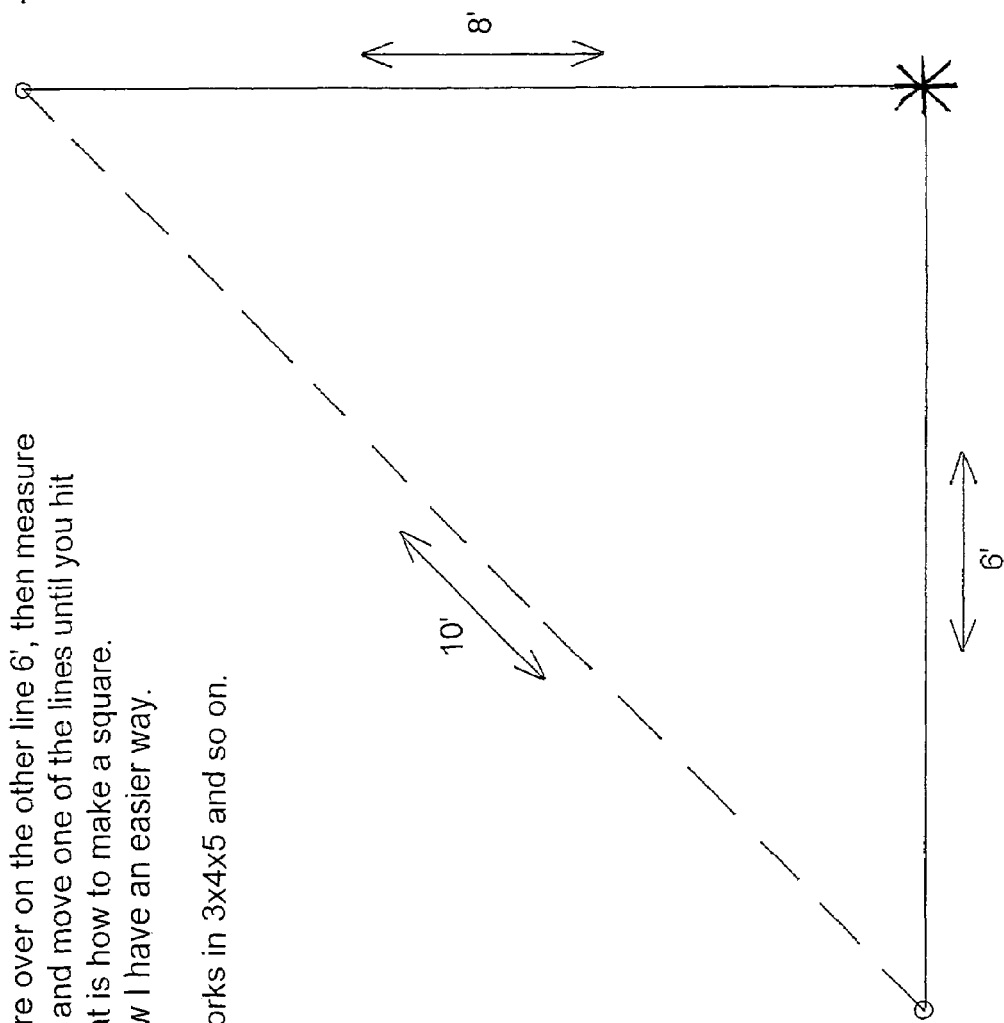
FIG. 17 shows yet another possible embodiment with additional description.

FIG. 15 shows another possible embodiment with additional description. FIG. 16 shows a further possible embodiment with additional description. FIG. 17 shows yet another possible embodiment with additional description.

One feature or aspect of an embodiment is believed at the time of the filing of this patent application to possibly reside broadly in a measurement and positioning arrangement for defining a 90 degree angle for positioning the corner of a building foundation, said arrangement comprising: a first stake being configured to be disposed in the ground; a second stake being configured to be disposed in the ground a distance from said first stake; a first string being configured to be tied between said first stake and said second stake; a laser device; said laser device comprising: a hook structure being configured to hang said laser device from said first string; at least one laser beam projector being configured to project a laser beam from said laser device substantially perpendicular to said first string; and a bubble level being configured to permit a user to verify a level position of said laser device with respect to the ground; a third stake being configured to be disposed in the ground a distance from said first stake and in the path of said laser beam projected from said laser device hanging from said first string; a fourth stake being configured to be disposed in the ground a distance from said third stake and in the path of said laser beam projected from said laser device hanging from said first string; and a second string being configured to be tied between said third stake and said fourth stake to intersect with said first string to define a 90 degree angle and a location where a corner of a building foundation will be placed.

Another feature or aspect of an embodiment is believed at the time of the filing of this patent application to possibly reside broadly in a measurement and positioning device for defining a 90 degree angle for positioning the corner of a building foundation, said device comprising: a hook structure being configured to hang said measurement and positioning device from a string tied between two stakes; and at least one laser beam projector being configured to project a laser beam from said measurement and positioning device substantially perpendicular to a string from which said measurement and positioning device is suspended to define a 90 degree angle and a location where a corner of a building foundation will be placed.

Yet another feature or aspect of an embodiment is believed at the time of the filing of this patent application to possibly reside broadly in a method of defining a 90 degree angle for positioning the corner of a building foundation, using a measurement and positioning device for defining a 90 degree angle for positioning the corner of a building foundation, said measurement and positioning device comprising: a hook structure being configured to hang said device from a string tied between two stakes; and at least one laser beam projector being configured to project a laser beam from said measurement and positioning device substantially perpendicular to a string from which said measurement and positioning device is suspended to define a 90 degree angle and a location where a corner of a building foundation will be placed; said method comprising the steps of: placing a first stake and a second stake in the ground on a line where a side of a building foundation will be located; tying a string between said first stake and said second stake; hanging said measurement and positioning device from said string; and switching on said measurement and positioning device to supply power to said at least one laser beam projector to project a laser beam from said measurement and positioning device substantially perpendicular to said string to define a 90 degree angle and a location where a corner of a building foundation will be placed.

The components disclosed in the various publications, disclosed or incorporated by reference herein, may be used in the embodiments of the present invention, as well as equivalents thereof.

The appended drawings in their entirety, including all dimensions, proportions and/or shapes in at least one embodiment of the invention, are accurate and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The details in the patents, patent applications and publications may be considered to be incorporable, at applicant's option, into the claims during prosecution as further limitations in the claims to patentably distinguish any amended claims from any applied prior art.

Some examples of lasers and laser beam projectors that may possibly be utilized or adapted for use in at least one possible embodiment of the present invention may possibly be found in the following U.S. Pat. No.: 6,195,901, entitled "Laser beam projector power and communication system;" U.S. Pat. No. 6,183,092, entitled "Laser projection apparatus with liquid-crystal light valves and scanning reading beam;" U.S. Pat. No. 6,150,938, entitled "Laser lighting assembly mounted on a forklift to project a light beam parallel to and in the same plane as a fork and utilized to accurately direct the fork into a fork receiving volume of a pallet, thereby avoiding any fork damage to a load on a pallet;" U.S. Pat. No. 6,025,908, entitled "Alignment of optical elements in telescopes using a laser beam with a holographic projection reticle;" U.S. Pat. No. 6,023,374, entitled "Compacted beam path expander, a method for expanding beam path and a large-area laser projection display system having a small compacted optical system;" U.S. Pat. No. 5,953,108, entitled "Laser beam projector power and communication system;" U.S. Pat. No. 5,933,393, entitled "Laser beam projection survey apparatus with automatic grade correction unit;" U.S. Pat. No. 5,925,871, entitled "Automatic laser projection scanner with improved laser beam scanning efficiency;" U.S. Pat. No. 5,782,003, entitled "Device for projecting a flat beam of diverging laser rays;" U.S. Pat. No. 5,757,563, entitled "Multi-angle laser beam projector;" U.S. Pat. No. 5,661,292, entitled "Automatic laser projection scanner with improved laser beam scanning efficiency;" U.S. Pat. No. 5,629,808, entitled "D-shape laser beam projector;" U.S. Pat. No. 5,629,756, entitled "Laser beam projection apparatus;" U.S. Pat. No. 5,108,177, entitled "Two-axis leveling instrument with a single pendulum for projecting a level laser beam;" U.S. Pat. No. 4,968,876, entitled "Laser beam reader having a projecting and receiving optical system;" U.S. Pat. No. 4,946,232, entitled "Variably curved reflector for projecting luminous lines on an object by a laser beam;" U.S. Pat. No. 4,945,315, entitled "Method of and apparatus for projecting a laser beam into light amplifier;" U.S. Pat. No. 4,812,000, entitled "System for generating frame sweeping with laser beam, in particular for projecting images;" U.S. Pat. No. 4,810,064, entitled "Liquid crystal projection display having laser intensity varied according to beam change-of-axis speed;" U.S. Pat. No. 4,768,958, entitled "Laser beam projector and mounting means therefor;" U.S. Pat. No. 4,693,567, entitled "Apparatus for projecting luminous lines on an object by a laser beam;" U.S. Pat. No. 4,662,707, entitled "Lighthouse structure and compensating lens in reference laser beam projecting apparatus;" U.S. Pat. No. 4,654,856, entitled "Laser beam projection device and arrangement for mounting a laser plasma tube therein;" U.S. Pat. No. 4,629,321, entitled "Grade setting and calibration arrangement for laser beam projection device;" U.S. Pat. No. 4,589,738, entitled "Apparatus for projecting a laser beam in a linear pattern;" and U.S. Pat. No. 3,997,267, entitled "Laser apparatus for projecting a narrow beam of light as a reference line."

Some examples of laser beam splitters that may possibly be utilized or adapted for use in at least one possible embodiment of the present invention may possibly be found in the following U.S. Pat. No. 6,694,630, entitled "Multiple-axis laser emitter with optical beam splitter;" U.S. Pat. No. 6,661,577, entitled "Wavelength-selective laser beam splitter;" U.S. Pat. No. 6,084,717, entitled "Laser beam splitter;" U.S. Pat. No. 5,528,426, entitled "Laser block beam splitter for microscopes;" and U.S. Pat. No. 5,002,371, entitled "Low coupling beam splitter and laser power or position monitor using same."

The invention as described hereinabove in the context of the preferred embodiments is not to be taken as limited to all of the provided details thereof, since modifications and variations thereof may be made without departing from the spirit and scope of the invention.

Appendix A included in this application shows additional drawings with notation to show and describe additional possible embodiments according to the present invention.

What is claimed is:

1. A measurement and positioning arrangement for defining a 90 degree angle for positioning the corner of a building foundation, said arrangement comprising:
   a first stake being configured to be disposed in the ground;
   a second stake being configured to be disposed in the ground a distance from said first stake;
   a first string being configured to be tied between said first stake and said second stake;
   a laser device;
   said laser device consisting essentially of:
      a hook structure being configured to hang said laser device from said first string;
      at least one laser beam projector being configured to project a laser beam from said laser device perpendicular to said first string; and
      a bubble level being configured to permit a user to verify a level position of said laser device with respect to the ground;
   a third stake being configured to be disposed in the ground a distance from said first stake and in the path of said laser beam projected from said laser device hanging from said first string;
   a fourth stake being configured to be disposed in the ground a distance from said third stake and in the path of said laser beam projected from said laser device hanging from said first string; and
   a second string being configured to be tied between said third stake and said fourth stake to intersect with said first string to define a 90 degree angle and a location where a corner of a building foundation will be placed.

2. A measurement and positioning device for defining a 90 degree angle for positioning the corner of a building foundation, said device consisting essentially of:
- a hook structure being configured to hang said measurement and positioning device from a string tied between two stakes; and
- at least one laser beam projector being configured to project a laser beam from said measurement and positioning device substantially perpendicular to a string from which said measurement and positioning device is suspended to define a 90 degree angle and a location where a corner of a building foundation will be placed.

3. The arrangement according to claim 1, wherein said laser device has a length of approximately three and a half inches.

4. The device according to claim 2, wherein said device has a length of approximately three and a half inches.

5. A measurement and positioning device for defining a 90 degree angle for positioning the corner of a building foundation, said device consisting essentially of:
- a hook structure being configured to hang said measurement and positioning device from a string tied between two stakes; and
- two laser beam projectors being configured to project two laser beams from said measurement and positioning device away from each other in opposite directions and substantially perpendicular to a string from which said measurement and positioning device is suspended to define a 90 degree angle and a location where a corner of a building foundation will be placed.

6. The device according to claim 5, wherein said device has a length of approximately three and a half inches.

* * * * *